No. 698,363. Patented Apr. 22, 1902.
A. BOURGEAT.
SAW PROTECTING HOOD.
(Application filed Aug. 7, 1901.)
(No Model.)
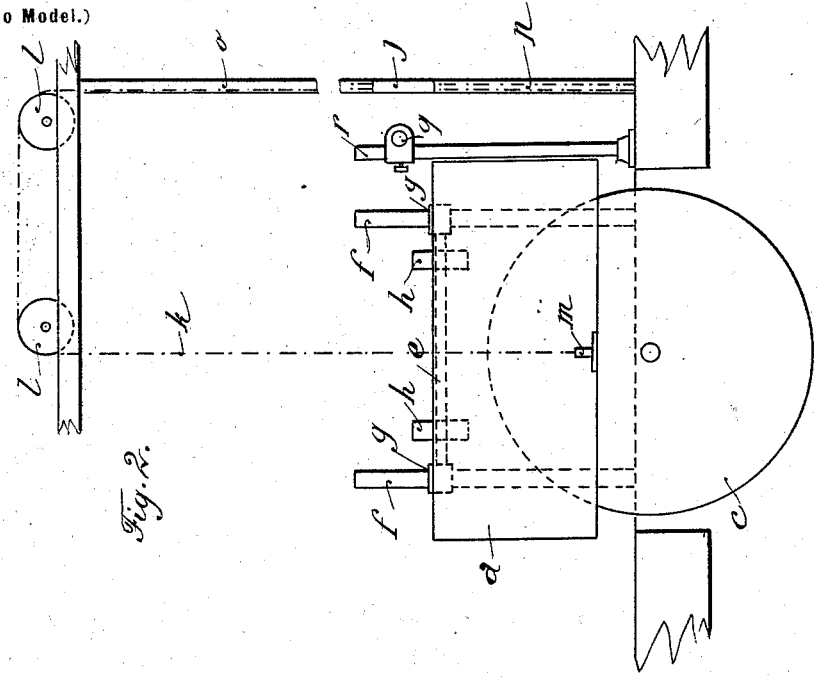
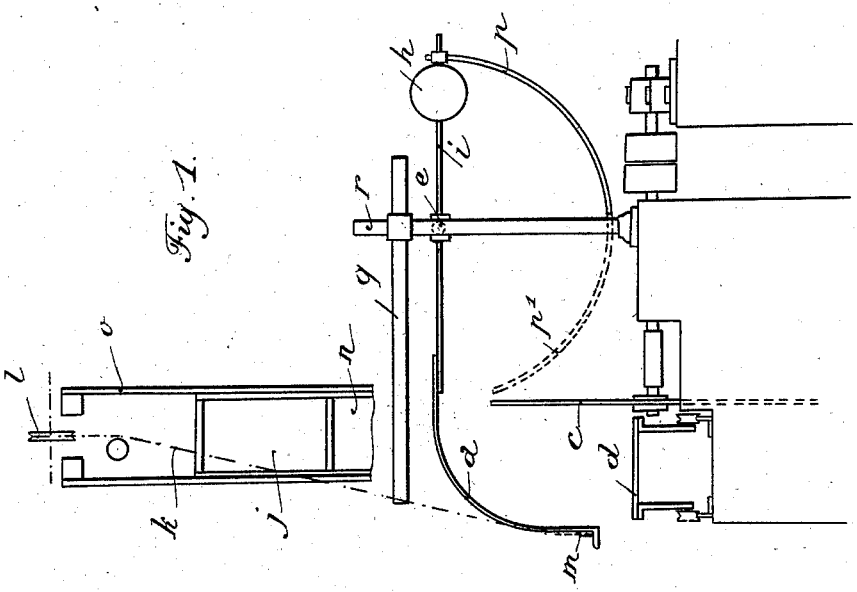
Witnesses:
J. H. Richardson
A. B. Stelle
Inventor
Auguste Bourgeat.
By G. Dittman, Atty.

UNITED STATES PATENT OFFICE.

AUGUSTE BOURGEAT, OF VOIROY, FRANCE.

SAW-PROTECTING HOOD.

SPECIFICATION forming part of Letters Patent No. 698,363, dated April 22, 1902.

Application filed August 7, 1901. Serial No. 71,202. (No model.)

*To all whom it may concern:*

Be it known that I, AUGUSTE BOURGEAT, a citizen of the French Republic, residing at Voiroy, France, have invented certain new and useful Improvements in Saw-Protecting Hoods; and I do hereby declare the following to be a full, clear, and exact description of the invention, such as will enable others skilled in the art to which it appertains to make and use the same.

The present invention has for its object a saw-protector which covers the saw-blade and the work operated on and which is provided with a special device which prevents any use of the saw as long as the operator has not removed the hood therefrom.

This invention is illustrated in the annexed drawings, in which—

Figure 1 is a side view of the device applied to a circular saw, partly broken away. Fig. 2 is a front view thereof.

The apparatus comprises a hood made of metal or the like, the length of which is rather greater than the largest saw-blade $c$ to be used and which leaves above the carriage $d$ a free space for passing a large piece of wood therethrough. Such hood, which comes down nearly to the level of the carriage, may oscillate about an axis $e$, carried by two vertical standards $f f$, fixed to the saw-frame with brackets $g$, which may slide on said standards. It is necessary that the hood can be lifted up as desired and be kept up in any position to allow of the saw-blade being removed either to replace or to sharpen it. For this purpose I may either use two counterweights $h$, fixed on the supporting-rods $i$ of the hood, mounted on the axis $e$, or use a single counterweight $j$, supported by a chain $k$, going over two pulleys $l l$ and fixed, as at $m$, to the hood, the essential condition to be observed being to make the counterweight so as to fully counterbalance the hood in any position.

The apparatus is completed by a device operated by the counterweights or counterweight and designed to prevent the feeding of a piece of wood to the saw when the hood is lifted up, which device retires automatically as soon as the head is pulled down again. For this purpose I may use in connection with weight $j$ a vertical plate $n$, attached to the counterweight and sliding in suitable guides $o$ and placing itself in front of the saw when the hood is lifted up. When the weights $h$ are used, an iron rod $p$, bent to a quarter-circle, is fixed to one of the rods $i$ which carry said weights. This rod $p$ is moved to the position $p'$ (shown in dotted lines in Fig. 1) at the same time the saw is uncovered by raising of the hood.

A horizontal metal bar $q$, mounted to slide on a rod $r$, fixed to the frame $a$ of the saw, is to prevent the work from being thrown back by the saw toward the operator who is guiding the same.

Having thus fully described my invention, what I claim as new, and desire to secure by Letters Patent of the United States, is—

1. The combination of a saw-frame, a saw mounted thereon, a protecting-hood pivoted above the saw, a counterpoising-weight therefor, and a device attached to the hood and moved, when the hood is raised, into position to prevent the feeding of work to the saw, substantially as described.

2. The combination of a saw-frame, a saw mounted thereon, a curved hood pivotally mounted above the saw, an extension of the hood beyond the pivot thereof, a counterweight on said extension, and a curved rod secured to the extension in position to prevent the feeding of work to the saw when the hood is raised, substantially as described.

In testimony whereof I affix my signature in presence of two witnesses.

AUGUSTE BOURGEAT.

Witnesses:
J. REYNIER,
J. BERGERET.